Patented Nov. 26, 1940

2,223,180

UNITED STATES PATENT OFFICE 2,223,180

ISOMERIZATION OF PARAFFIN HYDROCARBONS

Charles S. Lynch, Fanwood, and John E. Wood, III, Elizabeth, N. J., assignors to Standard Oil Development Company, a corporation of Delaware No Drawing. Application December 29, 1939, Serial No. 311,524

12 Claims. (Cl. 260—676)

The present invention relates to a novel process for the isomerization of straight chain hydrocarbons, in particular, paraffinic hydrocarbons, to produce branched chain hydrocarbons, in particular, isoparaffins.

Numerous processes have been proposed for converting normal paraffins into isoparaffins. The catalysts employed are usually of the Friedel Crafts type, such as aluminum chloride, aluminum bromide, zinc chloride, zirconium chloride, iron chloride and bromide, and the like. Activators, such as hydrogen chloride, hydrogen bromide and the like have been employed to increase the rate of conversion to the desired isomers.

In general, a greater percentage of a normal paraffin will be converted into the corresponding isoparaffin for a given amount of normal paraffin converted, the less drastic the reaction conditions imposed. However, this is disadvantageous by reason of the fact that the reaction may require an unduly long time to reach substantial completion. If steps are taken to increase the rate of reaction, more drastic reaction conditions are necessarily imposed. This results in cracking of the normal paraffins to a greater or lesser degree, thereby reducing the yields of isoparaffins based on a given quantity of normal paraffins reacted. For commercial operations, it is practically a necessity to employ at least moderately drastic conditions which may effect at least mild cracking of the feed. Not only are the paraffin molecules split but olefins are formed as well. These olefins tend to rapidly react with the aluminum halide catalysts thereby eventually impairing the catalyst efficiency for isomerization promotion. While the amount of olefins usually present is not large, nevertheless, the catalyst life and selectivity have been found to be materially increased by effectively removing the olefins from the reaction zone as they are formed so as to avoid excessive contact of cracked product with the isomerization catalyst.

The process of the present invention proposes to increase selectivity and effectively lengthen the life of Friedel Crafts catalysts when employed to promote the isomerization of normal paraffins by adding to these catalysts small amounts of other catalysts, chiefly those known to promote the alkylation of isoparaffins with olefins. Such catalysts may be selected from among the following: $H_2SO_4$, $FSO_3H$, $ClSO_3H$, etc. These, when used in conjunction with $AlCl_3$, either with or without the addition of a hydrogen halide promoter, improve the selectivity in the isomerization of normal paraffin hydrocarbons. It is preferred to carry out the isomerization reaction in the presence of the catalyst activated by the addition of small amounts of a promoter, such as hydrogen chloride, hydrogen bromide, and hydrogen fluoride. The use of hydrogen fluoride is particularly desirable since it not only acts as an isomerization promoter with an aluminum halide, but it is also effective as an alkylation catalyst as well.

The exact chemical composition of the catalyst is not at present known. The catalyst may be considered as simply a mixture of Friedel Crafts catalysts with an alkylation catalyst plus a hydrogen halide. It is considered highly probable, however, at least in the case of some specific component concentrations, for example, $AlCl_3$ and halo-sulfonic acid mixed in stoichiometric amounts, that definite catalyst complexes are formed. However, this has not been actually determined. Regardless of the actual mechanism and theory of the catalyst formation, the invention may be practiced by contacting at least one normal paraffin with a catalyst composition prepared by mixing at least one aluminum halide, preferably aluminum chloride, with at least one alkylation catalyst, preferably a halosulfonic acid, for example, fluorosulfonic acid, under the usual isomerization reaction conditions.

The reaction conditions found operable and desirable for the isomerization of normal paraffins, such as normal butane, normal pentane, normal hexane, etc., either as single compounds, or as mixtures of one or more of the normal paraffin homologues, field butanes, straight run paraffinic gasolines, etc., are those customarily employed for such feed stocks when employing a Friedel Crafts type of catalyst as the isomerization catalyst. In general, the process of the present invention is more useful and more effective when employing feed stocks the isomerization of which does not involve the isomerization of normal butane since normal butane does not tend to crack and dehydrogenate under the reaction conditions as readily as the higher homologues do. It is distinctly understood, however, that normal butane is quite satisfactorily isomerized to isobutane when employing the present process. The usefulness of the invention is ordinarily not fully realized when normal butane is isomerized.

A temperature range between about —50 and about +225° F. should be employed when using a catalyst containing appreciable amounts of halosulfonic acids. In general, temperatures between about 30 and about 200° F. may be used for normal butane and/or normal pentane, the higher temperatures being more desirable for use with normal butane. For the production of quite highly branched chain products, the lower temperatures may be preferable. For isomerizing normal paraffins above pentane, temperatures between about −25 and about +70° F. are useful, the lower temperatures being employed in contacting the higher straight chain paraffin homologues.

The time of contact is likewise subject to wide variation. In general, contact times between about ½ hour and about 15 hours are employed. The actual length of residence of the feed in the reaction chamber is correlated with the temperature employed, catalyst and activator concentrations, etc. Using the same temperature, butane requires a longer contact time than do the higher homologues. At a temperature of about 65° F. it requires about 3 hours to isomerize normal pentane to 60% isopentane; under similar conditions it requires about 350 hours to isomerize normal butane to isobutane with the same degree of completeness.

The amount of the aluminum halide present in the reaction chamber with reference to the total amount of hydrocarbon present therein at any one time may vary between about 10% and about 150% or even higher based on the total hydrocarbon in the reaction chamber at any one time. However, the extremely high percentages of aluminum halide become difficult to handle. The use of 10% aluminum halide is not generally advantageous although in the isomerization of normal butane to isobutane it is economically feasible to employ such a small amount of catalyst. The preferred aluminum halide concentration is generally between about 100% and about 150%.

The novel catalyst composition is prepared by admixing the desired quantity of akylation catalyst with the Friedel Crafts catalyst at room temperature or at the reaction temperature. The catalyst may be formed in the reactor directly or it may be preformed and added either to the feed in increments or added as a batch to the reaction chamber. The amount of halosulfonic acid or sulfuric acid added to the aluminum halide, for example, aluminum chloride, may vary between about 1 and about 20% by weight of the total hydrocarbon present in the reactor at any one time. In general from about 2 and about 8% is sufficient but where the feed contains substantial amounts of olefins, particularly mono- and diolefins, or where one or both of these types of olefins are produced in considerable amounts during the reaction, correspondingly larger quantities of alkylation catalysts may be added to the isomerization catalysts. Various catalyst compositions are: $AlCl_3 + FSO_3H$; $AlCl_3 + FSO_3H + HCl$; $AlCl_3 + ClSO_3H$; $AlCl_3 + ClSO_3H + HCl$; $AlCl_3 + FSO_3H + HF$; $AlCl_3 + H_2SO_4 + HCl$; $AlCl_3 + ClSO_3H + HBr$; $AlBr_3 + H_2SO_4 + HF$; $AlBr_3 + FSO_3H + HCl$; $AlF_3 + FSO_3H + HF$; $AlBr_3 + BrSO_3H + HBr$; etc.

The amount of hydrogen halide promoter employed may likewise be varied within wide ranges. Usually it may vary between about 3 and about 30% by weight based on the amount of hydrocarbons present in the reactor at any one time. It is preferable to employ about 5 to about 22% by weight of the hydrogen halide activator although in continuous operation, lower concentrations may be preferable. In general, the hydrogen halide is introduced into the reactor under superatmospheric pressure.

It has been found to be highly desirable to maintain the reaction medium in a state of vigorous agitation. Usually the better the agitation of the reaction medium, the higher the yield of desired isomers. Liquid phase operation is preferred. The use of superatmospheric pressure sufficient to maintain the hydrocarbons in the liquid phase under the conditions obtaining is therefore contemplated.

Unreacted reactants, activator, and heavier products of the reaction may be separated from the desired isomeric product and from each other and returned in whole or in part to the isomerization zone. Isomeric products of the reaction may be neutralized with a suitable alkali, for example, caustic soda, before subsequently utilizing the same. The resultant products may be employed as a portion of the feed stock to an alkylation unit, may be partially or substantially completely catalytically dehydrogenated and either fed to an alkylation or polymerization unit or the normal paraffin-isoparaffin mixture from the reaction zone may be employed directly as a blending agent in gasolines, in particular, aviation gasolines.

The apparatus employed for carrying out the isomerization may consist of a single reactor, equipped with an efficient stirring device, such as a mechanical agitator, jets of restricted internal diameter, turbo mixers, etc. A series of reactors, each equipped as described with respect to the single reactor, may be used either in parallel or in series. In a series arrangement, various stages of the reaction may be carried in each reactor under conditions best suited for that particular stage. More careful and accurate operation with greater flexibility and economy results. Temperatures, rates of throughput, catalyst and activator concentrations, etc. are accordingly adjusted to optimum conditions for each stage of the reaction.

The following examples are intended to be merely illustrative of several, but by no means all, of the modes of operation of the invention. The invention is not to be construed as limited to these examples.

*Example 1*

A catalyst composition containing about 150 grams of $AlCl_3$ and about 3 grams of $FSO_3H$ was contacted with about 150 grams of normal pentane in a pressure bomb maintained at about room temperature with a hydrogen chloride pressure of about 200-210 lbs./sq. in. gauge. This is about 22% by weight of HCl based on the total hydrocarbon in the bomb. About 18% of HCl was dissolved in the liquid hydrocarbon phase. The bomb was rotated so as to obtain a mild agitation of the contents thereof. After about three hours the contents of the bomb were removed, the isopentane isolated and the yields determined. About 81% by volume of the product obtained constituted isopentane, small amounts of $C_4$, $C_6$, and heavier hydrocarbons having been formed. About 91% by volume of the normal pentane reacted. The selectivity was therefore about 89%.

Under comparable conditions, except that no $FSO_3H$ was added to the catalyst, about 60% by volume of the product constituted isopentane, about 91% by volume of the normal pentane having reacted. The selectivity therefore was only about 67%.

Example 2

In another experiment conducted under substantially the same reaction conditions as set forth in Example 1 except that the catalyst composition contained about 15 grams of FSO₃H per 150 grams of AlCl₃, the reacted product contained about 62% by volume of isopentane. About 95% by volume of the normal pentane reacted. The selectivity was therefore about 65%.

Example 3

The percentages of HCl, AlCl₃ and ClSO₃H given in this example are all based on the total amount of hydrocarbon present in the reaction chamber at any one time. Normal pentane was contacted for about 2 hours at about 78° F. with vigorous agitation with about 22% HCl, about 100% AlCl₃, and about 2% ClSO₃H. A product containing about 65% by volume of isopentane together with about 3% by volume of C₄ and C₆ hydrocarbons, the remainder being unreacted n-pentane, was obtained. About 68% by volume of the normal pentane in the charge reacted. The selectivity was therefore about 94.5%.

Under comparable conditions, except that no ClSO₃H was employed, about 66% by volume of the product constituted isopentane, about 74% by volume of the original n-pentane having reacted. The selectivity in this run was only about 88%.

Having now thus fully described and illustrated the nature of the invention, what is claimed as new and useful and desired to be secured by Letters Patent is:

1. A process for isomerizing paraffinic hydrocarbons which comprises contacting at least one paraffinic hydrocarbon containing at least four carbon atoms per molecule with a catalyst composition prepared by admixing at least one Friedel Crafts type catalyst with at least one compound of the formula R—SO₃H wherein R is one of the group consisting of OH, F, Br and Cl under isomerization reaction conditions.

2. A process as in claim 1 wherein at least one hydrogen halide is added to the reaction mixture.

3. A process which comprises contacting at least one straight chain paraffinic hydrocarbon containing at least four carbon atoms per molecule with a catalyst composition prepared by admixing a major portion of at least one aluminum halide with a minor portion of at least one compound of the formula R—SO₃H wherein R is one of the group consisting of OH, F, Br and Cl, in the presence of at least one hydrogen halide under isomerization reaction conditions.

4. A process as in claim 3 wherein the reaction is carried out under sufficient superatmospheric pressure to maintain the paraffins in the liquid phase under the reaction conditions obtaining and wherein the reaction mixture is vigorously agitated.

5. A process which comprises isomerizing at least one straight chain paraffinic hydrocarbon containing at least four carbon atoms per molecule with between about 10 and about 150% by weight of aluminum halide based on the total hydrocarbon present in the reaction zone at any one time admixed with between about 1 and about 20% based on the total hydrocarbon present in the reaction zone at any one time of at least one compound R—SO₃H, R being a member of the group consisting of OH, F, Br and Cl, maintaining the reaction at a temperature between about −50 and about +225° F., under sufficient superatmospheric pressure to maintain the paraffins in the liquid phase, vigorously agitating the reaction mixture under the reaction conditions for between about ½ and about 15 hours in the presence of between about 3 and about 30% by weight of a hydrogen halide based on the total hydrocarbon content present in the reaction zone at any one time and recovering branched chain paraffins from the reacted mixture.

6. A process as in claim 5 wherein the reaction is carried out continuously.

7. A process which comprises isomerizing normal pentane by contacting the same at a temperature between about 30 and about 100° F. with vigorous agitation and in the liquid phase with a catalyst composition the aluminum chloride content of which is present in an amount between about 100 and about 150% by weight based on the total paraffins present in the reaction zone at any one time and containing between about 2 and about 8% by weight of a halosulfonic acid on the same basis in the presence of between about 5 and about 22% by weight of hydrogen chloride based on the total paraffins present in the reaction zone at any one time of hydrogen chloride for between about ½ and about 5 hours, withdrawing the reacted mixture and recovering isopentane.

8. A process as in claim 7 wherein the halosulfonic acid is fluorosulfonic acid.

9. A process as in claim 7 wherein the halosulfonic acid is chlorosulfonic acid.

10. A process as in claim 7 wherein the reaction is carried out continuously.

11. A process as in claim 7 wherein the reaction is carried out continuously and wherein the feed is a mixture of normal paraffins containing at least 5 carbon atoms per molecule.

12. A process which comprises isomerizing normal pentane with 100% AlCl₃ containing about 2% of FSO₃H at about room temperature under about 200 lbs./sq. in. gauge HCl pressure, with mechanical agitation for about three hours, and recovering the isopentane from the reacted mixture.

CHARLES S. LYNCH.
JOHN E. WOOD, III.